United States Patent
Curtin et al.

(10) Patent No.: US 8,202,348 B2
(45) Date of Patent: Jun. 19, 2012

(54) METHOD OF SEPARATING CARBON DIOXIDE

(76) Inventors: Lawrence Curtin, Fort Pierce, FL (US); Zechariah K. Curtin, Ft. Pierce, FL (US)

( * ) Notice: Subject to any disclaimer, the term of this patent is extended or adjusted under 35 U.S.C. 154(b) by 252 days.

(21) Appl. No.: 12/496,479

(22) Filed: Jul. 1, 2009

(65) Prior Publication Data

US 2010/0000852 A1   Jan. 7, 2010

Related U.S. Application Data

(60) Provisional application No. 61/077,376, filed on Jul. 1, 2008.

(51) Int. Cl.
*B01D 53/00* (2006.01)
(52) U.S. Cl. .................................. 95/31; 204/157.15
(58) Field of Classification Search ............... 95/28, 29, 95/31; 204/157.15
See application file for complete search history.

(56) References Cited

U.S. PATENT DOCUMENTS

| | | | |
|---|---|---|---|
| 3,480,529 A | 11/1969 | Walltrip | |
| 4,115,078 A * | 9/1978 | Janner et al. | 95/28 |
| 4,118,282 A | 10/1978 | Wallace | |
| 4,732,661 A | 3/1988 | Wright | |
| 7,058,108 B1 | 6/2006 | Cherne et al. | |

* cited by examiner

*Primary Examiner* — Robert A Hopkins
(74) *Attorney, Agent, or Firm* — Stephen C. Thomas; Hayworth, Chaney & Thomas P.A.

(57) ABSTRACT

A method of dissociating or decomposing the elemental components of a medium within a treatment zone via application of radio frequency energy. The selected medium may be communicated to a treatment zone, such as a chamber, wherein the chamber walls and/or a plurality of antenna disposed within the chamber or treatment zone emit radio frequency energy capable of separating the elemental components of the selected medium. The plurality of antenna may further comprise a chemical coating disposed thereon to facilitate the medium separation process. Denser elemental components may be removed from a bottom portion of the chamber or treatment zone, while lighter elemental components may be removed from an upper portion of the chamber or treatment zone. A vacuum pump or any other means known within the art may be used to remove the elemental components from the chamber or treatment zone.

20 Claims, 3 Drawing Sheets

METHOD OF SEPARATING CARBON DIOXIDE

CROSS REFERENCE TO RELATED APPLICATIONS

This application claims the benefit of provisional patent application Ser. No. 61/077,376, filed with the USPTO on Jul. 1, 2008, which is herein incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to methods of decomposing a gaseous medium, more specifically, the present invention relates to methods of utilizing radio frequency energy to separate the elemental components of gases such as carbon dioxide.

2. Background Art

In recent years, from the standpoint of conserving the earth's environment, the increase of the concentration of carbon dioxide gas in the atmosphere has come to pose a problem. The ambient concentration of carbon dioxide, which is one of the main causes of global warming, is increasing at a rate of 1 or more ppm every year, attributable to the consumption of fossil fuels, and thus, techniques for the effective treatment thereof are regarded as very important in the interest of energy resources and the environment. For the purpose of decreasing the gross amount of the carbon dioxide gas that is released into the atmosphere, attempts have been made to harness a gas turbine or a fuel cell for either recovering and recycling the carbon dioxide gas from the effluent gas emanating from energy plants and chemical plants which use fuels having hydrocarbons as main components thereof or depriving the effluent gas of harmfulness. Additional techniques for recovering carbon dioxide include absorption methods and adsorption methods, which have reached the stage of practical usefulness. Further, in the recovery of carbon dioxide from a great amount of exhaust gas, drastic reduction of energy consumption is required, but is presently difficult to technically implement.

In addition to carbon dioxide's potential effect on the environment, carbon dioxide also plays a major role in closed or sealed breathing environments. The breathing in of oxygen produces carbon dioxide as a "waste gas". Carbon dioxide is an odorless gas that occurs naturally in air in a very small proportion of 0.03 vol %. Higher carbon dioxide contents in the surrounding air have an unfavorable physiological effect on humans. As small a concentration as 0.5 vol % $CO_2$ in the surrounding air produces typical symptoms such as headache, which is why the maximal workplace concentration of $CO_2$ is set at 0.5 vol % (5000 ppm).

In closed air conditioned spaces, for example, it is desirable to be able to regulate the carbon dioxide content in the air wherein excess $CO_2$ is continuously removed from the air. Moreover, lowering the $CO_2$ content can be advantageously combined with additional measures to improve the room climate, for example, by enrichment of the room air with oxygen as well as air conditioning.

Conventional oxygen enrichment methods for improvement of the air quality in closed air circulation systems and rooms or cabins are mostly based on pure oxygen enrichment devices such as for example pressure swing adsorption systems or hollow fiber membrane systems. Exemplary corresponding devices are described in U.S. Pat. Nos. 4,867,766; 5,890,366; 6,427,484; 5,158,584 and 4,896,514.

It has been known for a long time in various respiration processes that the breathing gases administered are prepared in a cyclic process for reasons of economy, safety and environmental protection, and components being consumed are replaced by supplementary feed and components whose concentration increases are maintained below a critical concentration value by separation.

The most important component whose concentration increases in a respiration system is carbon dioxide. The percentage of carbon dioxide that is to be removed depends on the particular application. Expiratory breathing air contains approximately 5% carbon dioxide. This concentration is to be reduced in cyclic processes to a maximum of 0.5%. In closed breathing circuits, as they may occur in space applications, submarines, mining, and the like, the percentage of carbon dioxide is usually to be reduced to markedly lower concentrations. The gas mixture from which the carbon dioxide is to be removed is likewise subject to variations in terms of its composition from one application to the next.

In order to avoid the disadvantageous environmental effects and/or physiological effects of carbon dioxide enrichment in room air stated above there is a demand for suitable and/or scalable systems and methods which make possible a depletion of the carbon dioxide content in the global atmosphere or room air of a closed environment for the purpose of separating the carbon dioxide in an efficient manner while simultaneously climatizing or enriching the global atmosphere or room air with oxygen that is a product of the carbon dioxide separation process.

BRIEF SUMMARY OF THE INVENTION

In accordance with one embodiment, a method of separating components of a gaseous medium, the method comprising the steps of providing the gaseous medium to a treatment zone, wherein the treatment zone comprises a plurality of antenna, and emitting radio frequency energy from the plurality of antenna for separating the gaseous medium into at least one lighter elemental component and at least one denser elemental component.

The present invention further discloses a system for separating components of a gaseous medium, the system comprising a storage structure for sequestering the gaseous medium, a treatment zone in communication with the storage structure, wherein a valve is disposed between the storage structure and the treatment zone for controlling the flow of the gaseous medium both into and out from the storage structure, a plurality of antenna disposed and extending within the treatment zone, wherein the plurality of antenna is capable of emitting radio frequency energy for separating the gaseous medium into at least one lighter elemental component and at least one denser elemental component, and a radio frequency generator in electrical communication with the plurality of antenna by means of a radio frequency cable disposed between the plurality of antenna and the radio frequency generator.

The present invention further provides a system for separating components of a gaseous medium, the system comprising a storage structure for sequestering the gaseous medium, a treatment chamber in communication with the storage structure, wherein a valve is disposed between the storage structure and the treatment chamber for controlling the flow of the gaseous medium both into and out from the storage structure, wherein at least a portion of an inner surface of the treatment chamber is coated with a chemical compound to facilitate separation of the gaseous medium into at least one lighter elemental component and at least one denser elemental component, and a radio frequency generator in electrical communication with the at least a portion of the inner surface of the treatment chamber by means of a radio frequency cable disposed between the radio frequency generator and the at least a portion of the inner surface of the treatment chamber, wherein the at least a portion of the inner surface of the treatment chamber is capable of emitting radio frequency energy in the range from 1.00 MHz to 80.00 MHz, wherein the chemical compound is selected from the group consisting of potassium oxide, potassium hydroxide, sodium hydroxide, calcium hydroxide, metal hydroxides, monoethanolamine, and soda lime, wherein the gaseous medium comprises carbon dioxide, the at least one lighter elemental component comprises oxygen, and the at least one denser elemental component comprises carbon.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

The present invention generally comprises a method of dissociating or decomposing the elemental components of a medium within a treatment zone via application of radio frequency energy. The selected medium may be communicated to a treatment zone, such as a chamber, wherein the chamber walls and/or a plurality of antenna within the chamber or treatment zone emit radio frequency energy capable of assisting in the separation of the elemental components of the selected medium. Denser elemental components may be removed from a bottom portion of the chamber or treatment zone, while lighter elemental components may be removed from an upper portion of the chamber or treatment zone. A vacuum pump or any other means known within the art may be used to remove the elemental components from the upper portion and lower portion of the chamber or treatment zone, respectively.

Figure 1:
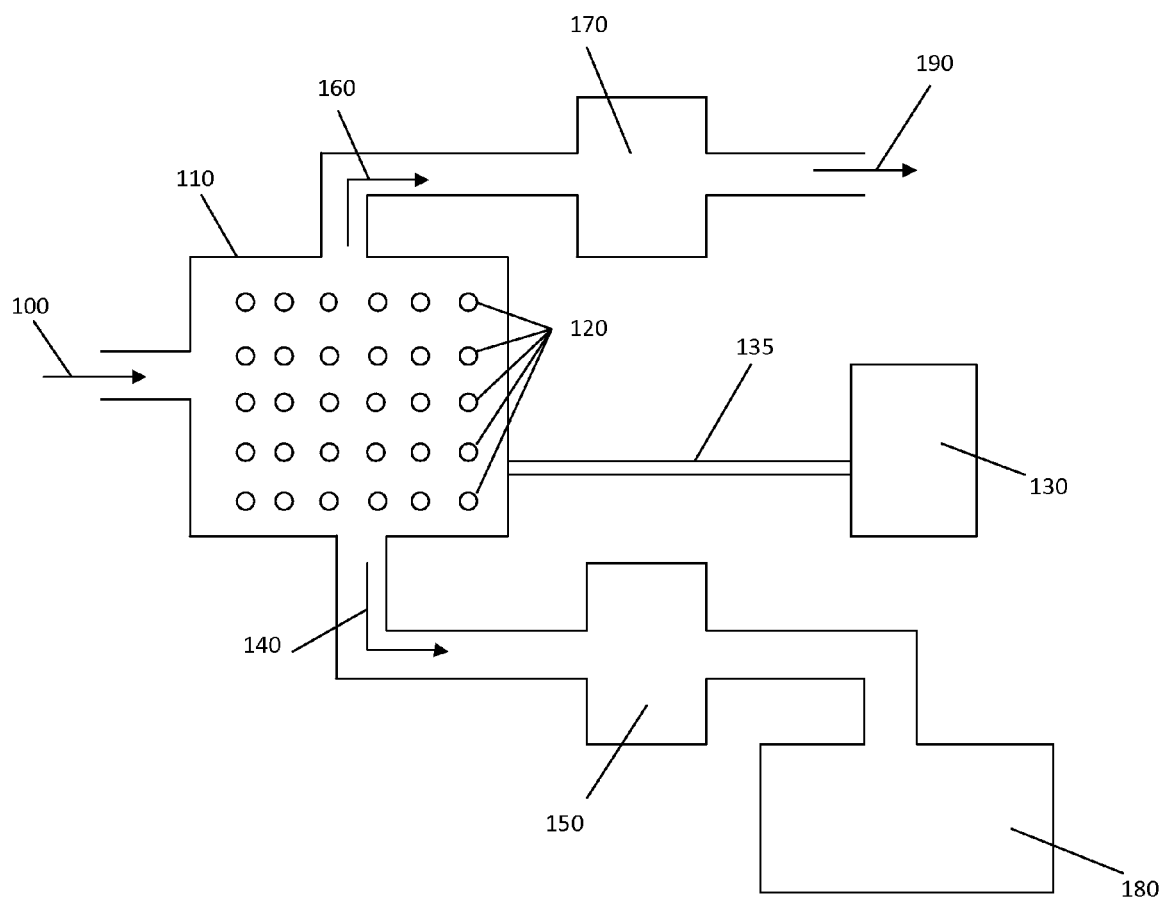
FIG. 1 depicts a schematic view of one embodiment of the present invention.

FIG. 1 depicts a schematic illustration of one embodiment of the present invention. A medium source 100 may supply the medium to a chamber or treatment zone 110. The chamber or treatment zone 110 may contain a plurality of antenna 120 which may be insulated from the chamber or treatment zone 110 wall. In one embodiment, the plurality of antenna 120 may extend to the opposing wall without coming into physical contact with the opposing wall. The plurality of antenna 120 may be in communication with a radio frequency generator 130 via a radio frequency cable 135. Alternatively or additionally, the walls of the chamber or treatment zone 110 may be in communication with the radio frequency generator 130 via the radio frequency cable 135, wherein the walls of the chamber may emit radio frequency energy.

In use, as further shown in FIG. 1, the plurality of antenna 120 and/or walls of the treatment zone 110 may emit a radio frequency. The radio frequency may be in tune with the elemental components of the selected medium. The radio frequency may act to separate the elemental components, wherein at least one relatively denser elemental component may fall to the bottom portion of the chamber or treatment zone 110 and then such an at least one denser elemental component may be motivated to exit 140 the lower portion of the chamber or treatment zone 110 by a variety of methods including but not limited to a lower vacuum pump 150 or the like. At least one lighter elemental component may rise into an upper portion of the chamber or treatment zone 110 and then be motivated to exit 160 the upper portion of the chamber or treatment zone 110 by a variety of methods including but not limited to an upper vacuum pump 170 or the like. Depending on the selected medium, the lower vacuum pump 150 and upper vacuum pump 170 may independently communicate their respective at least one elemental components to respective storage tanks and the like, vent to the atmosphere if collection of the elemental component is not desired, or any combination thereof. For purposes of illustration only, FIG. 1 depicts the lower vacuum pump 150 communicating its at least one denser elemental component to a storage tank 180, while the upper vacuum pump 170 is depicted venting 190 its respective at least one lighter elemental component to the atmosphere.

Figure 2:
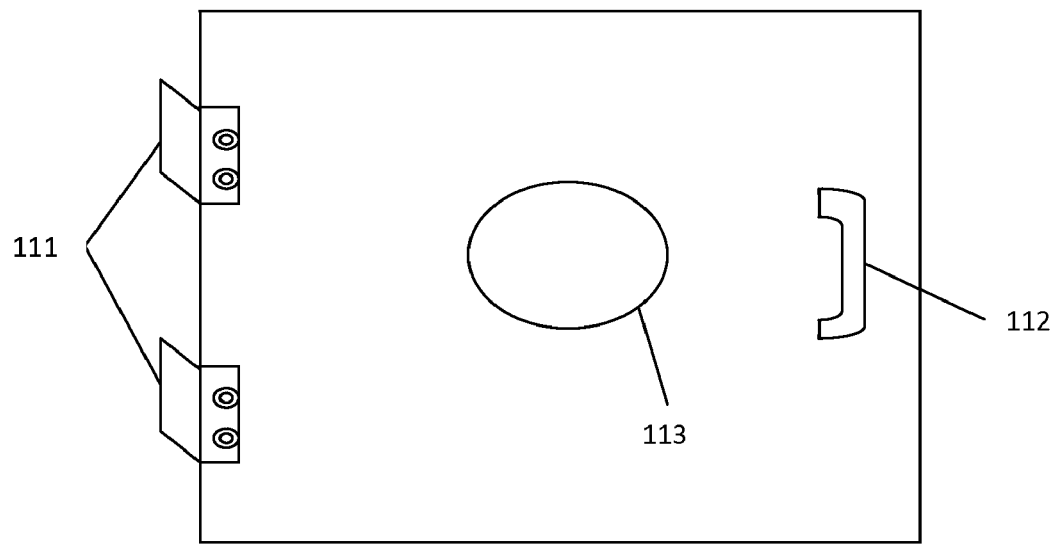
FIG. 2 depicts a front view of an embodiment of a chamber or treatment zone of the present invention.

FIG. 2 depicts one embodiment of a front view of the chamber or treatment zone 110. Such an embodiment may comprise a door having one or more hinges 111, a handle 112, and a window 113. The method of the present invention may be utilized continuously, with stoppages only being required for periodic cleaning and maintenance. The door depicted in FIG. 2 may serve to facilitate such periodic cleaning and maintenance. While FIG. 2 illustrates one possible embodiment for access to the chamber or treatment zone 110, such structure is not essential to the present invention and may comprises any structures or equivalents known within the art.

Figure 3:
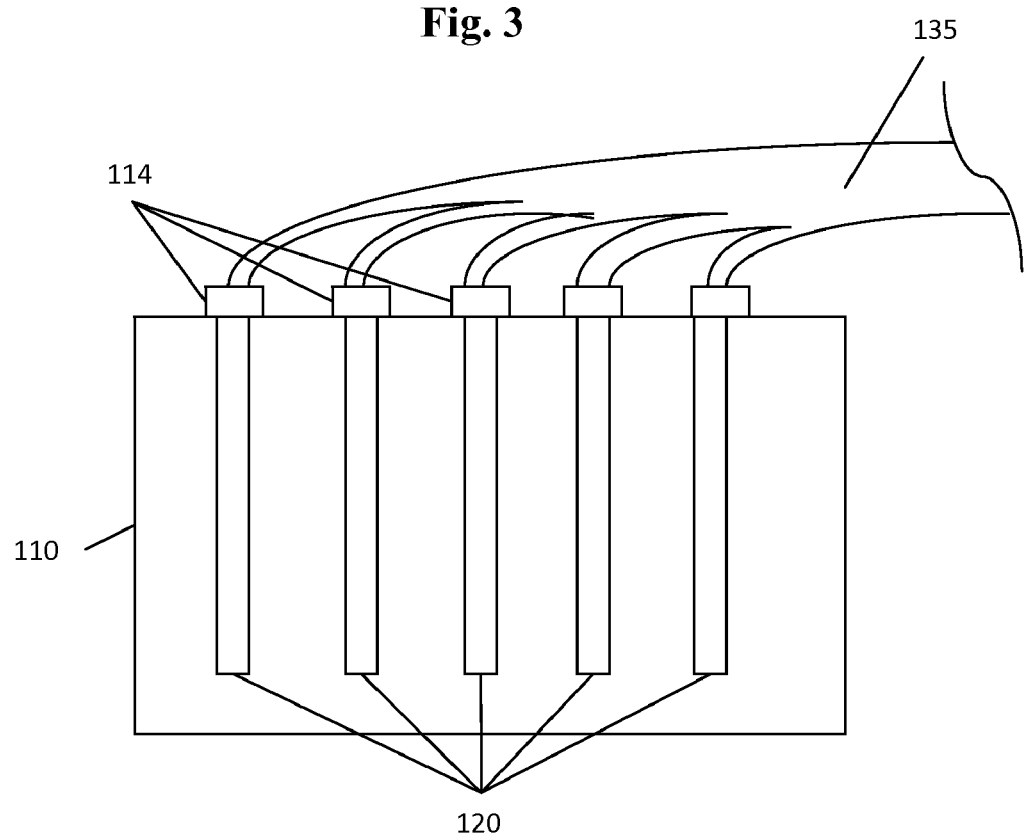
FIG. 3 depicts a top cross sectional view of an embodiment of a chamber or treatment zone of the present invention.

FIG. 3 depicts a top view of one embodiment of a chamber or treatment zone 110 of the present invention. As shown, the plurality of antenna 120 may be insulated from the outer wall of the chamber or treatment zone 110 by a plurality of insulators 114. FIG. 3 further depicts the radio frequency cable 135 connecting the plurality of antenna 120 to the radio frequency generator 130 (not shown).

In a preferred embodiment, the medium source 100 may supply $CO_2$ to the chamber or treatment zone 110, but the medium 100 may also take the form of $CO_3$, $CO_4$, any other compound gases comprising carbon and oxygen, or any other compound gases known within the art. A plurality of radio frequency antenna 120 is disposed inside of the chamber or treatment zone 110. The plurality of antenna 120 may be attached to a radio frequency generator 130 via a radio frequency cable 135 (see FIG. 1). The plurality of antenna 120 may be insulated from the walls of the chambers or treatment zone 110. The plurality of antenna 120 may extend to the opposing wall of the chamber or treatment zone 110 but may not touch the opposing wall. In alternate embodiments, the walls of the chamber or treatment zone 110 may be connected to the radio frequency generator 135. The plurality of antenna 120 and/or the walls of the chamber or treatment zone 110 may emit a radio frequency that is in tune with the elemental components of the selected medium, such as carbon and oxygen in a preferred medium. The radio frequency energy separates the denser carbon elemental component from the lighter oxygen elemental component. The denser elemental carbon component may then separate or fall to the bottom portion of the chamber or treatment zone 110 and be drawn out 140 by a lower vacuum pump 150 and into a storage tank 180 if desired (as shown in FIG. 1). The lighter oxygen elemental component may rise to the upper portion of the chamber or treatment zone 100 and be drawn out 160 by an upper vacuum pump 170 and be released 190 back into the atmosphere, if so desired. The radio frequency emitted may operate in the range of 1 MHz to 80 MHz, a preferred embodiment for separating carbon dioxide may operate at 13.56 MHz. Each respective gaseous medium may have its own optimal or effective frequency to assist in separating the elemental components of the medium. Thus, the emitted radio frequency may be varied depending on the density of the selected gaseous medium.

Figure 4:
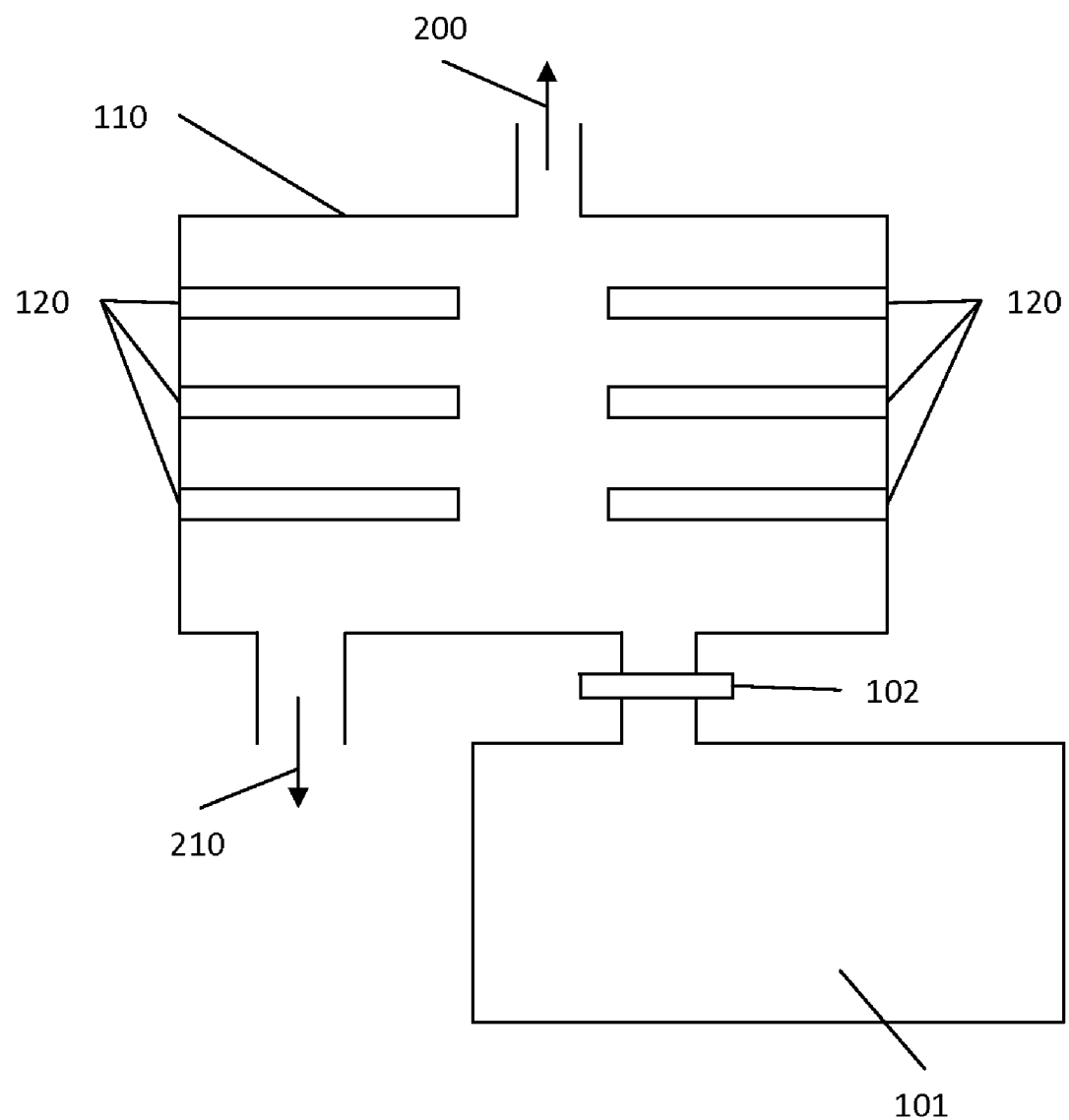
FIG. 4 depicts a schematic view of another embodiment of the present invention.

FIG. 4 illustrates an alternative embodiment of a system and method for separating a compound gaseous medium. In a preferred embodiment the compound gaseous medium comprises $CO_2$, and merely for the purpose of facilitating the disclosure the present embodiment the description will involve the separation of $CO_2$. In this embodiment, the medium source 100 may comprise a selected gaseous medium such $CO_2$ being sequestered within a storage structure 101 including but not limited to a chamber, a tank, a natural structure such as a cave or cavern, and the like. The storage structure may be in communication with a "well head" or valve 102 that may be used to control input and/or output of the selected medium to and/or from the storage structure 101. With the medium sequestered in the storage structure 101, a chamber or treatment zone 110 may be disposed in communication with the valve 102 and thereby in communication with the storage structure 101 and the selected medium sequestered therein. The valve may function to release the medium, such as $CO_2$, into the chamber or treatment zone 110 as needed to facilitate the present inventive separation process.

A plurality of radio frequency (RF) rods or antenna 120 may be disposed within the chamber or treatment zone 110. The rods or antenna 120 may be insulated at their point of contact with the walls of the chamber or treatment zone 110 via a plurality of insulators 114, as shown in FIG. 3. The plurality of RF rods or antenna 120 may be coated with a chemical compound that assists in separating the elements of the selected gaseous medium, $CO_2$. In a preferred embodiment, the chemical coating may comprise potassium-based chemistry, but the chemical coating may include but is not limited to potassium oxide, potassium hydroxide, sodium hydroxide, calcium hydroxide, metal hydroxides, monoethanolamine (MEA), soda lime, and the like. The chemical compound acts to draw the $CO_2$ onto the rod or antenna 120 where the gaseous medium is then separated into its elemental components by the RF energy emitted from the plurality of rods or antenna 120. Such a separation process is continuous and ongoing. The separated elemental components, such as carbon and the oxygen, are then expelled from the chemical coating as new medium, such as $CO_2$, is attracted and absorbed. Similar chemistries have been used in submarines to filter $CO_2$ from the contained environment, without the assistance RF energy to facilitate the separation process. After separation, the at least one lighter elemental component, such as oxygen, may exit 200 through a conduit out from an upper portion of the chamber or treatment zone 110 and may be then vented to the atmosphere or stored for future use. Similarly, the at least one denser elemental component, such as carbon, may exit 210 from the lower portion of the chamber or treatment zone 110 and may then be vented to the atmosphere, stored for future use, or routed back into the storage structure 101.

The present invention provides for a system and method of separating a gaseous medium, such as $CO_2$, into its elemental components. Current technologies separate gaseous compounds either electrostatically or by using a filter that has a potassium-based chemistry coated thereon. In both prior cases, filters are used and such filters must be continually replaced. The present invention provides a system and method of separating gaseous compounds without the need for a filter thereby eliminating the need and hassle associated with changing and maintaining filters as used with the prior technologies.

The embodiments depicted in FIGS. 1-4 are meant to be illustrative in nature only, and the scope of the present invention includes other embodiments and variation within the knowledge of one of ordinary skill in the art. The elements depicted within the figures are not drawn to scale but are merely schematic in nature to facilitate the disclosure of the present invention. The scope and breadth of the present invention may include all gaseous mediums having two or more elemental components capable of separation and the methods and/or structures may be scaled up or down as needed.

While the above description contains much specificity, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by the examples given.

What is claimed is:

1. A method of separating components of a gaseous medium, said method comprising the steps of:
providing said gaseous medium to a treatment zone, wherein said treatment zone comprises a plurality of antenna; and
emitting radio frequency energy from said plurality of antenna for separating said gaseous medium into at least one lighter elemental component and at least one denser elemental component.

2. The method of claim 1, further comprising the steps of:
drawing said at least one lighter elemental component from an upper portion of said treatment zone; and
drawing said at least one denser elemental component from a lower portion of said treatment zone.

3. The method of claim 1, wherein said gaseous medium comprises carbon dioxide, said at least one lighter elemental component comprises oxygen, and said at least one denser elemental component comprises carbon.

4. The method of claim 1, wherein said treatment zone is a chamber.

5. The method of claim 1, wherein said plurality of antenna is in communication with a radio frequency generator via a radio frequency cable disposed between said plurality of antenna and said radio frequency generator.

6. The method of claim 4, wherein each of said plurality of antenna is insulated from the walls of said chamber via a plurality of insulators.

7. The method of claim 1, wherein said radio frequency energy is emitted in the range from 1.00 MHz to 80.00 MHz.

8. The method of claim 1, wherein said radio frequency energy is emitted at 13.56 MHz.

9. The method of claim 2, wherein said step of drawing said at least one lighter elemental component comprises creating suction via an upper vacuum pump and said step of drawing said at least one denser elemental component comprises creating suction via a lower vacuum pump.

10. The method of claim 1, wherein a chemical compound is coated onto the outer surface of said plurality of antenna within said treatment zone for facilitating the separation of said gaseous medium.

11. The method of claim 10, wherein said chemical compound is selected from the group consisting of potassium oxide, potassium hydroxide, sodium hydroxide, calcium hydroxide, metal hydroxides, monoethanolamine, and soda lime.

12. A system for separating components of a gaseous medium, said system comprising:
   a storage structure for sequestering said gaseous medium;
   a treatment zone in communication with said storage structure, wherein a valve is disposed between said storage structure and said treatment zone for controlling the flow of said gaseous medium both into and out from said storage structure;
   a plurality of antenna disposed and extending within said treatment zone, wherein said plurality of antenna is capable of emitting radio frequency energy for separating said gaseous medium into at least one lighter elemental component and at least one denser elemental component; and
   a radio frequency generator in electrical communication with said plurality of antenna by means of a radio frequency cable disposed between said plurality of antenna and said radio frequency generator.

13. The system of claim 12, wherein a chemical compound is coated onto the outer surface of said plurality of antenna within said treatment zone for facilitating the separation of said gaseous medium, said chemical compound being selected from the group consisting of potassium oxide, potassium hydroxide, sodium hydroxide, calcium hydroxide, metal hydroxides, monoethanolamine, and soda lime.

14. The system of claim 12, wherein said gaseous medium comprises carbon dioxide, said at least one lighter elemental component comprises oxygen, and said at least one denser elemental component comprises carbon.

15. The system of claim 12, wherein each of said plurality of antenna is insulated from the walls of said treatment zone via a plurality of insulators.

16. The system of claim 12, wherein said radio frequency energy is emitted in the range from 1.00 MHz to 80.00 MHz.

17. The system of claim 12, wherein said radio frequency energy is emitted at 13.56 MHz.

18. The system of claim 12, further comprising:
   an upper vacuum pump connected to an upper portion of said treatment zone capable of generating suction to draw said at least one lighter elemental component from said upper portion of said treatment zone.

19. The system of claim 12, further comprising:
   a lower vacuum pump connected to a lower portion of said treatment zone capable of generating suction to draw said at least one denser elemental component from said lower portion of said treatment zone.

20. A system for separating components of a gaseous medium, said system comprising:
   a storage structure for sequestering said gaseous medium;
   a treatment chamber in communication with said storage structure, wherein a valve is disposed between said storage structure and said treatment chamber for controlling the flow of said gaseous medium both into and out from said storage structure, wherein at least a portion of an inner surface of said treatment chamber is coated with a chemical compound to facilitate separation of said gaseous medium into at least one lighter elemental component and at least one denser elemental component; and
   a radio frequency generator in electrical communication with said at least a portion of said inner surface of said treatment chamber by means of a radio frequency cable disposed between said radio frequency generator and said at least a portion of said inner surface of said treatment chamber, wherein said at least a portion of said inner surface of said treatment chamber is capable of emitting radio frequency energy in the range from 1.00 MHz to 80.00 MHz;
   wherein said chemical compound is selected from the group consisting of potassium oxide, potassium hydroxide, sodium hydroxide, calcium hydroxide, metal hydroxides, monoethanolamine, and soda lime;
   wherein said gaseous medium comprises carbon dioxide, said at least one lighter elemental component comprises oxygen, and said at least one denser elemental component comprises carbon.

* * * * *